US008318847B2

(12) United States Patent
Cao et al.

(10) Patent No.: US 8,318,847 B2
(45) Date of Patent: Nov. 27, 2012

(54) PLASTIC COMPOSITIONS AND PRODUCTS PRODUCED THEREFROM

(75) Inventors: Feng Cao, Loudonville, NY (US); Michael Donovan, Evansville, IN (US); William A. Kernick, III, Evansville, IN (US); Guangda Shi, Evansville, IN (US)

(73) Assignee: Sabic Innovative Plastics IP B.V. (NL)

( * ) Notice: Subject to any disclaimer, the term of this patent is extended or adjusted under 35 U.S.C. 154(b) by 2157 days.

(21) Appl. No.: 11/239,997

(22) Filed: Sep. 30, 2005

(65) Prior Publication Data

US 2007/0078216 A1    Apr. 5, 2007

(51) Int. Cl.
C08K 3/22    (2006.01)

(52) U.S. Cl. ........................................ 524/497; 524/600

(58) Field of Classification Search .................. 524/497, 524/600
See application file for complete search history.

(56) References Cited

U.S. PATENT DOCUMENTS

| | | | |
|---|---|---|---|
| 3,803,085 A | 4/1974 | Takehoshi | |
| 3,847,867 A | 11/1974 | Heath | |
| 3,850,885 A | 11/1974 | Takekoshi | |
| 3,852,242 A | 12/1974 | White | |
| 3,855,178 A | 12/1974 | White et al. | |
| 3,905,942 A | 9/1975 | Takekoshi et al. | |
| 3,957,526 A | 5/1976 | Hodgkin et al. | |
| 3,961,975 A | 6/1976 | Zannucci et al. | |
| 3,971,755 A | 7/1976 | Zannucci et al. | |
| 3,972,902 A | 8/1976 | Heath et al. | |
| 3,983,093 A | 9/1976 | Williams, III et al. | |
| 4,287,228 A | 9/1981 | Schlesinger | |
| 4,357,170 A | 11/1982 | Brand | |
| 4,388,425 A | 6/1983 | Strehler et al. | |
| 4,443,591 A | 4/1984 | Schmidt et al. | |
| 4,455,410 A | 6/1984 | Giles, Jr. | |
| 4,965,308 A * | 10/1990 | Roovers et al. | 524/421 |
| 5,256,728 A | 10/1993 | Dardaris et al. | |
| 5,373,306 A | 12/1994 | Amore et al. | |
| 6,017,993 A | 1/2000 | Maeda et al. | |
| 6,133,360 A | 10/2000 | Barren et al. | |
| 6,355,723 B1 * | 3/2002 | van Baal et al. | 524/602 |
| 6,410,614 B1 | 6/2002 | Jones et al. | |
| 6,432,515 B1 | 8/2002 | Titze et al. | |
| 6,607,794 B1 | 8/2003 | Wilson et al. | |
| 6,916,548 B2 | 7/2005 | Murschall et al. | |
| 2003/0035944 A1 | 2/2003 | Blackwell | |
| 2003/0224193 A1 | 12/2003 | Murschall et al. | |
| 2007/0077410 A1 * | 4/2007 | Shi | 428/317.1 |

FOREIGN PATENT DOCUMENTS

| | | |
|---|---|---|
| EP | 0420655 A2 | 9/1990 |
| EP | 0526 161 A1 | 7/1992 |
| JP | 5163433 | 6/1993 |
| JP | 06009811 A * | 1/1994 |
| WO | 0024580 A1 | 5/2000 |
| WO | 2004036661 A2 | 4/2004 |

OTHER PUBLICATIONS

Yang, Ching-Ping et al. "Colorless polyimides from 2,3,3',4'-biphenyltetracarboxylic dianhydride (a-BPDA) and various aromatic bis(ether amine)s bearing pendent trifluoromethyl groups," CAT.INIST abstract of Polymer, 46:15, 2005, pp. 5797-5807.*
Yang, Ching-Ping et al. "Organosoluble and light-colored fluorinated polyimides from 4-tert-butyl-[1,2-bis(4-amino-2-trifluoromethylphenoxy)phenyl]benzene and aromatic dianhydrides," Science direct abstract of Reactive and Functional Polymers, 66:7, Jul. 2006, pp. 689-701.*
EASTOBRITE: Optical Brighteners for Clear, Nonpigmented Polymers by Eastman, no date.*
Full English-language translation of JP 06-009811 A, Jan. 18, 1994.*
JP5163433. Publication Date Jun. 29, 1993. "Production of Colored Polyetherimide Resin Composition". (Abstract Only).
JP02146079. Publication Date Jun. 5, 1990. "Base Material for Heat Resistant Printing and Label and Method for Forming and Fixing Label". (Abstract Only).
JP07157581. Publication Date Dec. 3, 1993. "White Polyester Film". (Abstract Only).
JP05108011. Publication Date Apr. 30, 1993. "Adhesive Label Having Hiding Power". (Abstract Only).

* cited by examiner

*Primary Examiner* — Vickey Nerangis
(74) *Attorney, Agent, or Firm* — Cantor Colburn LLP (57) ABSTRACT

In one embodiment, a plastic composition can comprise: a plastic, a white pigment, and a non-white colorant. The composition can have a whiteness index of greater than or equal to about 50, and a composition yellowness index of less than 10, as measured on a 3 mm thick color chip under D65 illuminant and 2 degree observer. Also disclosed are articles made from the plastic composition.

27 Claims, 4 Drawing Sheets

FIG. 3
Dynamic TGA

PLASTIC COMPOSITIONS AND PRODUCTS PRODUCED THEREFROM

BACKGROUND

This disclosure generally relates to plastic compositions, methods of manufacture, and uses thereof, and particularly relates to yellowness index of plastics.

Polyimides possess many desirable properties, such as, for example, high heat resistance, flame retardance, dimensional stability, strength, chemical resistance, biocompatibility, high dielectric strength, and transparence. Correspondingly, polyetherimide is employed for the manufacture of a wide-range of articles. Some of these applications include automotive applications (e.g., air intake manifolds, fluids handling, lighting applications, electrical connectors), medical applications (e.g., vascular infusion ports, luer connectors, stopcocks, dialysis filters), aerospace applications (e.g., interior semi-structural components, interior cladding, fluids handling, electrical connections), and electrical applications (e.g., electrical connectors, structural components). Furthermore, polyetherimide lends itself to most forms of thermoplastic processing and conversion, such as extrusion, injection molding, and the like. Although polyetherimides possess these, and other beneficial properties, it's utility can be hindered in some applications due to it's inherent amber color. This is especially the case in applications in which bright white colors are desired.

U.S. Pat. No. 3,957,526 to Hodgkin et al., is directed to titanium dioxide pigments and fillers, and teaches adjusting surface chemistry of the titanium dioxide, and using the titanium dioxide in polymers. Hodgkin et al. teach, among other things that, when the titanium dioxide with the modified surface is used in polymers, dispersion is faster and better in non-aqueous systems.

U.S. Pat. No. 3,971,755 to Zannucci et al. notes that polymer compositions which contain titanium dioxide pigment are sometimes more susceptible to photodegradation and are more difficult to stabilize against such photodegradation than are the unpigmented polymers. Zannucci et al. state that "the addition of 20% titanium dioxide (Ti-Pure R-100) to polypropylene reduces the lifetime to embrittlement of 5-mil thick films from 4 days to 1.5 days (irradiated at 65°-70° C. with 3000 A lamps)." (Col. 1, lines 31-35) Zannucci et al., therefore, address ultraviolet light stabilization of polymer compositions, and more particularly address ultraviolet light stabilization of titanium dioxide-pigmented polymer compositions. In a preferred embodiment of Zannucci et al., the titanium dioxide pigmented polymer is a polyolefin, and particularly a propylene containing polyolefin such as polypropylene or a polypropylene having grafted thereto acrylic acid or maleic anhydride or acid. The titanium dioxide is used in an amount of from 0.05 weight percent (wt %) to about 50 wt %, based on the weight of the polymer, with 0.5 wt % to 10 wt % titanium dioxide preferred in a molding composition, 0.1 wt % to 2 wt % titanium dioxide preferred in a fiber forming composition, and 5 wt % to 30 wt % titanium dioxide preferred in a coating composition.

U.S. Pat. No. 4,388,425 to Strehler et al. is directed to concentrates of titanium dioxide in polycaprolactam. Concentrates of from 20 wt % to 50 wt % of titanium dioxide in polycaprolactam are taught.

U.S. Pat. No. 5,256,728 to Dardaris et al. is directed to polycarbonate compositions comprising unpacified titanium dioxide. The amount of titanium dioxide employed is about 1 wt % to 20 wt % based on polycarbonate. Due to the redistribution of the polycarbonate, the titanium dioxide may be unpacified (i.e., titanium dioxide free from a polysiloxane coating). Dardaris et al. teach preparing a pigmented polycarbonate composition by melt equilibrating a linear or branched polycarbonate in the presence of a catalytic amount of a carbonate redistribution catalyst selected from the group consisting of bases and Lewis acids, to form a redistributed polycarbonate; and blending said redistributed polycarbonate with an amount effective for pigmentation of titanium dioxide free from polysiloxane coating.

U.S. Pat. No. 6,410,614 to Jones et al. is directed to incorporating titanium dioxide into materials such as polyamides, copolyamides, polyester, polyolefins, and polyurethanes. The titanium dioxide particles are present in an amount between about 60 wt % to about 70 wt % of the composition.

U.S. Pat. No. 6,607,794 to Wilson et al. is directed to light reflecting molded articles comprising a thermoplastic or thermoset polymer matrix in which is dispersed rutile titanium dioxide and a flame retardant material. They teach that the combined effects of the impurities in ABS and the opacity of rutile titania below 420 nanometers render the light reflected from the article somewhat lacking at the blue end of the visible spectrum. This problem may be addressed through the use of clear, transparent matrix polymers. Hence, polymers useful according to Wilson et al. comprise those with yellowness indices (YI) values of less than about 10, preferably less than about 5, and most preferably less than about 2.

There remains a continuing need in the art for improvements to produce bright white polymer compositions and products from yellow polymers. In particular, there is a continuing need for improvements to produce white polymer compositions and products wherein the yellow polymer has (either before or after processing), a YI (yellowness index) of greater than 11.

BRIEF SUMMARY

Disclosed herein are plastic compositions, methods of making the compositions, and articles made therefrom.

In one embodiment, a plastic composition can comprise: a virgin plastic, a white pigment, and a non-white colorant. The composition can have a whiteness index of greater than or equal to about 50, a composition yellowness index of less than 10, and a brightness of greater than or equal to 50, as measured on a 3 mm thick color chip under D65 illuminant and 2 degree observer.

In one embodiment, a polyimide composition can comprise: polyimide, a white pigment, and a non-white colorant. The composition can have a whiteness index of greater than or equal to about 50, a composition yellowness index of less than or equal to about 15, and a brightness of greater than or equal to 50, as measured on a 3 mm thick color chip under D65 illuminant and 2 degree observer.

The above described and other features are exemplified by the following figures and detailed description.

BRIEF DESCRIPTION OF THE DRAWINGS

Refer now to the figures, which are exemplary embodiments.

DETAILED DESCRIPTION

At the outset, it should be noted that ranges might be disclosed herein which are inclusive and combinable (e.g., ranges of "up to about 25 parts per hundred by weight (pph), with about 5 pph to about 20 (pph) desired", is inclusive of the endpoints and all intermediate values of the ranges of "about 5 (pph) to about 25 (pph)," etc). Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by the context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants).

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. Unless specifically specified otherwise, all parts per hundred (pph) discussed herein are by weight, per 100 parts of the plastic (e.g., polyetherimide or the like).

Unless specifically specified to the contrary, yellowness, whiteness, and brightness were determined using 3 millimeter (mm) color chips, prepared in using an 85 ton injection molder at molding temperatures of 640° F. (338° C.) to 680° F. (360° C.) with a mold temperature of 225° F. (107° C.), that were spectroscopically analyzed on a GretagMacbeth Color Eye 7000 spectrophotometer. Yellowness Index (YI) is determined per ASTM E313-73 (D1925) under D65 illuminant and 2 degree observer, Whiteness Index (WI) is determined according to CIE Ganz 82 (as specified the GretagMacbeth spectrophotometer manual), and Brightness Index (Br) is determined according to TAPPI T542 (1987).

Actually, with virgin plastics that have a yellowness index (YI) of greater than or equal to about 35, it can be difficult to form products having a light color, a bright color, and/or being bright white. Virgin plastic is plastic as made (polymers, copolymers, and so forth), without additional ingredients, and includes plastic that has a YI index of great than 11 (or, more specifically, greater than 20) before processing, and plastic that is capable of having a YI of greater than 11 (or, more specifically, greater than 15) after processing and/or aging (such as thermal and/or photo aging). For example, it can be difficult to attain the plastic with a YI of less than 10 when the initial YI is greater than or equal to about 20, or, more specifically greater than or equal to about 30, or, even more specifically, greater than or equal to about 40, yet more specifically, greater than or equal to about 50, and even more specifically, greater than or equal to about 60. Yet, it is desirable to form a plastic composition and/or product from a plastic having an initial YI of greater than or equal to about 35 can be produced with a YI of less than or equal to about 15, or, more specifically, YI of less than 10.

Figure 1:
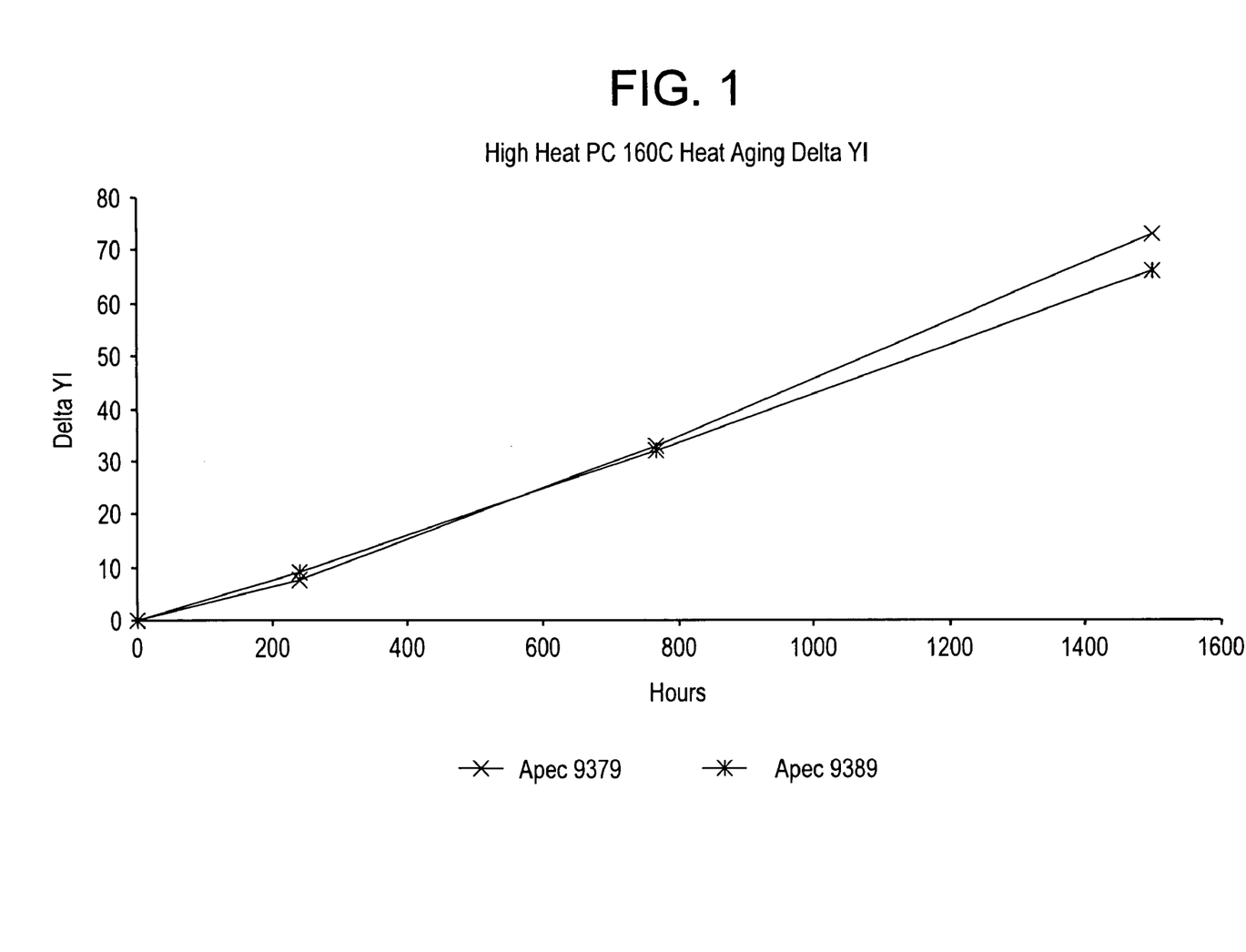
FIG. 1 is a graphical representation of the change in yellowness index for high heat polycarbonates after thermal aging at 160° C. over time.

Some plastics, even those having low initial YI values (e.g., less than 10), can have a high YI after processing (such as abusive molding (e.g., where the plastic dwells in the molder barrel for an extended period of time under elevated molding temperatures that may cause thermal degradation of the polymer), and/or YI that increases over time, for example, due to aging (such as photo aging and/or thermal aging). A change in YI over time with thermal aging is illustrated in FIG. 1 for high heat polycarbonate (PC) which show that the YI increases over time.

As with materials that have an initially high YI, production of final products having a low YI, high whiteness (WI), and high brightness is desirable. Plastics that would otherwise having a plastic YI of greater than 11, or, more specifically, greater than or equal to about 15, or, more specifically greater than or equal to about 20, or, even more specifically, greater than or equal to about 25, and even more specifically, greater than or equal to about 40, can be produced with a YI of less than 10, i.e., a YI for the plastic itself without the white pigment and non-white colorant(s), after processing and aging, of less than 10. In other words, plastics that either have an initial YI of greater than 11, and/or whose final YI after processing and/or aging is greater than 11, etc., can be formed into products with a YI of less than 10.

Possible plastics that inherently have or can attain a YI of greater than 11 (e.g., at a point in time such as virgin material, after processing, and/or after aging) include: polycarbonates (e.g., high heat polycarbonate having a glass transition temperature of greater than or equal to 170° C., iso-terephthalic resorcinol), polyarylene ethers, polyphenylenes, polysulfones, polyimides (e.g., polyetherimide), polyarylates, polyketones (such as polyetheretherketone), and others. Also included in these plastics are combinations comprising at least one of the foregoing plastics, as well as reaction products formed from a reaction with at least one of the foregoing plastics. Polycarbonates (including copolycarbonates) include Lexan® PC, Lexan® PPC and the iso-terephthalic resorcinol based Lexan® PEC resins all commercially available from General Electric Plastics, Pittsfield, Mass. and APEC® PEC resin commercially available from Bayer MaterialScience LLC, Pittsburgh, Pa. as well as polycabonate/polyester blends commercially available under the trademark Xylex® resins also from General Electric Plastics, Pittsfield, Mass. Polyarylene ethers include Noryl® PPO resins commercially available from General Electric Plastics, Pittsfield, Mass. Polyphenylenes include Parmax® commercially available from Mississippi Polymer Technologies, Inc., Bay Saint Louis, Miss.). Polysulfones include Ultrason S and Ultrason E, commercially available from BASF Corporation, Florham, N.J., as well as Radel A, Radel R, Supradel, and Udel reins commercially available from Solvay Advanced Polymers Alpharetta, Ga. Polyimides (such as polyetherimides) include Aurum® commercially available from Mitsui Chemicals America, Inc., Purchase, N.Y., and Vespel® resins commercially available from DuPont™, Wilmington, Del., as well as Ultem® rein commercially available from General Electric Plastics, Pittsfield, Mass. Polyarylates include U-Polymer commercially available from Unitika Plastics Division, Osaka, Japan. Polyketones include Victrex® PEEK™ and Victrex® PEK™ from Victrex plc Lancashire UK, Kadel® PAEK from Solvay Advanced Polymers. Also included in these plastics are combinations comprising at least one of the foregoing plastics, as well as reaction products formed from a reaction with at least one of the foregoing plastics.

Polyetherimide comprises desirable performance characteristics. The material possesses high heat resistance, excellent mechanical properties, excellent solvent resistance, flame retardance, dimensional stability, biocompatibility, and high dielectric strength. Polyetherimide (PEI) however possesses a deep amber color that differentiates itself from other polymers. Although the polymers color is acceptable in many applications, in some applications it is undesirable, such as labeling or printed surface applications, for example, contrast applications. As a result, the acceptance of PEI has been hindered in these applications due to the materials inherent yellowness.

As will be discussed in greater detail below, the plastic compositions and products produced with the YI of less than 10, can also have a whiteness index (WI) of greater than or equal to about 50, or, more specifically, greater than or equal to about 60, or, even more specifically, greater than or equal to about 70, and, yet more specifically, greater than or equal to about 75. Additionally, these compositions and products can attain a brightness (Br) of greater than or equal to about 50, or, more specifically, greater than or equal to about 60, or yet more specifically, greater than or equal to about 70, and, even more specifically, greater than or equal to about 72. For example, polyetherimide resin compositions comprising polyetherimide resin, white pigment, and a colorant have been developed that are capable producing a bright white articles comprising a whiteness index (WI) of greater than or equal to about 70, a yellowness index (YI) of less than or equal to about 10, and a brightness (Br) of greater than or equal to 72.

Thermoplastic polyimides have the general formula (1):

(1)

wherein a is more than 1, typically about 10 to about 1,000 or more, or more specifically about 10 to about 500; and wherein V is a tetravalent linker without limitation, as long as the linker does not impede synthesis or use of the polyimide. Suitable linkers include but are not limited to: (a) substituted or unsubstituted, saturated, unsaturated or aromatic monocyclic and polycyclic groups having about 5 to about 50 carbon atoms, (b) substituted or unsubstituted, linear or branched, saturated or unsaturated alkyl groups having 1 to about 30 carbon atoms; or combinations comprising at least one of the foregoing. Suitable substitutions and/or linkers include, but are not limited to, ethers, epoxides, amides, esters, and combinations comprising at least one of the foregoing. At least a portion of the linkers V contain a portion derived from a bisphenol. Desirably linkers include but are not limited to tetravalent aromatic radicals of structures (2)

(2)

, and wherein W is a divalent moiety including —O—, —S—, —C(O)—, —SO2-, —SO—, —CyH2y- (y being an integer from 1 to 5), and halogenated derivatives thereof, including perfluoroalkylene groups, or a group of the formula —O—Z—O— wherein the divalent bonds of the —O— or the —O—Z—O— group are in the 3,3', 3,4', 4,3', or the 4,4' positions, and wherein Z includes, but is not limited to, divalent radicals of formulas (3).

(3)

wherein Q includes but is not limited to a divalent moiety including —O—, —S—, —C(O)—, —SO2-, —SO—, —CyH2y- (y being an integer from 1 to 5), and halogenated derivatives thereof, including perfluoroalkylene groups.

R in formula (1) includes but is not limited to substituted or unsubstituted divalent organic radicals such as: (a) aromatic hydrocarbon radicals having about 6 to about 20 carbon atoms and halogenated derivatives thereof; (b) straight or branched chain alkylene radicals having about 2 to about 20 carbon atoms; (c) cycloalkylene radicals having about 3 to about 20 carbon atoms, or (d) divalent radicals of the general formula (4)

(4)

wherein Q includes but is not limited to a divalent moiety including —O—, —S—, —C(O)—, —SO$_2$—, —SO—, —C$_y$H$_{2y}$— (y being an integer from 1 to 5), and halogenated derivatives thereof, including perfluoroalkylene groups.

Exemplary classes of polyimides include polyamidimides and polyetherimides, particularly those polyetherimides which are melt processible, such as those whose preparation and properties are described in U.S. Pat. Nos. 3,803,085 and 3,905,942.

Exemplary polyetherimide resins comprise more than 1, typically about 10 to about 1,000, or more specifically, about 10 to about 500 structural units, of the formula (5)

(5)

wherein T is —O— or a group of the formula —O—Z—O— wherein the divalent bonds of the —O— or the —O—Z—O— group are in the 3,3', 3,4', 4,3', or the 4,4' positions, and wherein Z includes, but is not limited, to divalent radicals of formula 10 as defined above.

In one embodiment, the polyetherimide may be a copolymer which, in addition to the etherimide units described above, further contains polyimide structural units of the formula (6)

(6)

wherein R is as previously defined for formula (1) and M includes, but is not limited to, radicals of formulas (7).

(7)

The polyetherimide can be prepared by various methods, including, but not limited to, the reaction of an aromatic bis(ether anhydride) of the formula (8)

(8)

with an organic diamine of the formula (9)

H$_2$N—R—NH$_2$     (9)

wherein R and T are defined in relation to formulas (1) and (5).

Examples of specific aromatic bis(ether anhydride)s and organic diamines are disclosed, for example, in U.S. Pat. Nos. 3,972,902 and 4,455,410. Illustrative examples of aromatic bis(ether anhydride)s of formula (8) include: 2,2-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, as well as various mixtures comprising at least one of the foregoing.

The bis(ether anhydride)s can be prepared by the hydrolysis, followed by dehydration, of the reaction product of a nitro substituted phenyl dinitrile with a metal salt of a bisphenol compound (e.g., BPA) in the presence of a dipolar, aprotic solvent. An exemplary class of aromatic bis(ether anhydride)s included by formula (8) above includes, but is not limited to, compounds wherein T is of the formula (10):

(10)

and the ether linkages, for example, are in the 3,3', 3,4', 4,3', or 4,4' positions, and mixtures comprising at least one of the foregoing, and where Q is as defined above.

Any diamino compound may be employed. Examples of suitable compounds are ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2, 2-dimethylpropylenediamine, N-methyl-bis(3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3, 5-diethylphenyl) methane, bis(4-aminophenyl) propane, 2,4-bis(b-amino-t-butyl) toluene, bis (p-b-amino-t-butylphenyl) ether, bis(p-b-methyl-o-aminophenyl) benzene, bis(p-b-methyl-o-aminopentyl) benzene, 1, 3-diamino-4-isopropylbenzene, bis(4-aminophenyl) sulfide, bis (4-aminophenyl) sulfone, bis(4-aminophenyl) ether and 1,3-bis(3-aminopropyl) tetramethyldisiloxane. Mixtures of these compounds may also be present. Desirably, the diamino compounds are aromatic diamines, especially m- and p-phenylenediamine and mixtures comprising at least one of the foregoing.

In one embodiment, the polyetherimide resin comprises structural units according to formula 5 wherein each R is independently p-phenylene or m-phenylene or a mixture comprising at least one of the foregoing and T is a divalent radical of the formula (11)

(11)

Included among the many methods of making the polyimides, particularly polyetherimides, are those disclosed in U.S. Pat. Nos. 3,847,867, 3,850,885, 3,852,242, 3,855,178, 3,983, 093, and 4,443,591.

The reactions can be carried out employing solvents, e.g., o-dichlorobenzene, m-cresol/toluene and the like, to effect a reaction between the anhydride of formula (8) and the diamine of formula (9), at temperatures of about 100° C. to about 250° C. Alternatively, the polyetherimide can be prepared by melt polymerization of aromatic bis(ether anhydride)s (8) and diamines (9) by heating a mixture of the starting materials to elevated temperatures with concurrent stirring. Generally, melt polymerizations employ temperatures of about 200° C. to about 400° C. Chain stoppers and branching agents may also be employed in the reaction.

When polyetherimide/polyimide copolymers are prepared, a dianhydride, such as pyromellitic anhydride, is used in combination with the bis(ether anhydride). The polyetherimide resins can optionally be prepared from reaction of an aromatic bis(ether anhydride) with an organic diamine in which the diamine is present in the reaction mixture at less than or equal to about 0.2 molar excess. Under such conditions the polyetherimide resin may have less than or equal to about 15 microequivalents per gram (μeq/g) acid titratable groups, or, more specifically less than or equal about 10 μeq/g acid titratable groups, as shown by titration with chloroform solution with a solution of 33 weight percent (wt %) hydrobromic acid in glacial acetic acid. Acid-titratable groups are essentially due to amine end-groups in the polyetherimide resin.

One route for the synthesis of polyetherimides proceeds through a bis(4-halophthalimide) having the following structure (12):

(12)

wherein R is as described above and X is a halogen. The bis(4-halophthalimide) wherein R is a 1,3-phenyl group (13) is particularly useful.

(13)

Bis(halophthalimide)s (12) and (13) are typically formed by the condensation of amines, e.g., 1,3-diaminobenzene with anhydrides, e.g., 4-halophthalic anhydride (14):

(14)

Polyetherimides may be synthesized by the reaction of the bis(halophthalimide) with an alkali metal salt of a bisphenol such as bisphenol A or a combination of an alkali metal salt of a bisphenol and an alkali metal salt of another dihydroxy substituted aromatic hydrocarbon in the presence or absence of phase transfer catalyst. Suitable phase transfer catalysts are disclosed in U.S. Pat. No. 5,229,482. Suitable dihydroxy substituted aromatic hydrocarbons include those having the formula (15)

OH-A²-OH (15)

wherein $A^2$ is a divalent aromatic hydrocarbon radical. Suitable $A^2$ radicals include m-phenylene, p-phenylene, 4,4'-biphenylene, and similar radicals.

Virgin PEI, comprises a yellowness index (YI) of about 55 or greater. Experiments have been conducted (See Table 1 below) where a white pigment has been integrated into a polyetherimide resin in an effort to reduce the yellowness of the material. More specifically, titanium dioxide ($TiO_2$) was added at a 10 parts per hundred parts polyetherimide. At this loading, the white pigment produced a "creamy" colored polymer that exhibited a high yellowness. Thereafter two additional experiments were conducted in which the concentration of the $TiO_2$ was subsequently increased. Analyzing the visual properties of these materials the yellowness of the composition remained unacceptably high compared to a commercially accepted standard, even when the concentration of the $TiO_2$ reached 30 pph.

To achieve the desired low yellowness, e.g., bright white product, a non-white colorant can be added to a plastic composition. The colorant can comprise any pigment, dye, or the like, as well as combinations comprising at least one of the foregoing that adjusts the yellowness of the composition as desired. In other words, non-white color can be added to a plastic to increase the whiteness of the plastic, by reducing the yellowness. The non-white colorant can be a color that exhibits a reflectance of greater than or equal to about 15%, or, more specifically, greater than or equal to about 25%, or, even more specifically, greater than or equal to about 30%, and, yet more specifically, greater than or equal to about 35%, at wavelengths of about 380 nanometers (nm) to about 580 nm. The reflectance is measured from a 3 mm thick color chip made with the virgin polymer and the non-white colorant, utilizing a GretagMacbeth Color Eye 7000 spectrophotometer, wherein the chip comprises the polymer resin, $TiO_2$, and the colorant at loading level sufficient enough to be detected for reflectance by the spectrophotometer.

The non-white colorant can be present in an amount of about 0.0001 to about 1.0 pph, or more specifically, about 0.005 pph to about 0.5 pph, or more specifically, about 0.01 pph to about 0.25 pph, and yet more specifically, about 0.05 pph to about 0.15 pph, and can be any colorant with the desired spectral properties. Exemplary non-white colorants comprise, but are not limited to, C.I. Solvent Violet 13, C.I. Solvent Violet 36, C.I. Pigment Blue 15:4, C.I. Pigment Blue 29, and the like, as well as combinations comprising at least one of the foregoing.

The plastic composition with a YI of less than or equal to about 10 comprises a white pigment in an amount of about 18 parts per hundred (pph) to about 45 pph, or more specifically, about 20 pph to about 35 pph, or even more specifically, about 20 pph to about 30 pph. Suitable white pigments can comprise, but are not limited to, C.I. Pigment White (such as C.I. Pigment White 4, C.I. Pigment White 5, C.I. Pigment White 6, C.I. Pigment White 6, C.I. Pigment White 6:1, C.I. Pigment White 7, C.I. Pigment White 8, C.I. Pigment White 9, C.I. Pigment White 10, C.I. Pigment White 11, C.I. Pigment White 12, C.I. Pigment White 13, C.I. Pigment White 14, C.I Pigment White 15, C.I. Pigment White 17, C.I. Pigment White 18, C.I. Pigment 18:1, C.I. Pigment White 19, C.I. Pigment White 20, C.I. Pigment White 21, C.I. Pigment White 22, C.I. Pigment White 23, C.I. Pigment White 24, C.I. Pigment White 25, C.I. Pigment White 26, C.I. Pigment White C.I. Pigment White 28, C.I. Pigment White 30, C.I. Pigment White 32, C.I. Pigment White 33, C.I. Pigment White 34, and so forth), titanium dioxide, aluminum phosphate, aluminum trihydroxide, white potassium iodide, calcium silicate, zirconium carbonate, barium titanate, and the like, as well as combinations comprising at least one of the foregoing.

With a polyetherimide composition, for example, a white composition can be obtained with a weight ratio of white pigment (such as titanium dioxide) to the other non-white colorant(s) of about 1:0.0001 to about 1:0.01, e.g., about 1:0.0002 to about 1:0.0005.

The non-white colorant and white pigment can be mixed into the plastic utilizing any method. For example, the non-white colorant and white pigment can be mixed with the plastic to form a reaction product of the plastic, the non-white colorant, and the white pigment. However a masterbatch or masterblend processes can be employed for ease of use for the end-user. A masterbatch generally refers to a process of dispersing the materials (e.g., non-white colorant, white pigment, additive (such as filler, stabilizer, modifier, processing aid, antimicrobial, and so forth)) in a carrier (e.g., thermoplastic, wax, and the like) by employing melt-processing equipment (e.g., batch mixers, continuous mixers, twin screw compounding extruder, single screw extruder, and the like) to produce a masterbatch that can be in a pelletized or beaded form. These pellets or beads can then be added to a base resin at a specific ratio to color the base resin during a melt processing operation, which can be concurrent with the production of an article of manufacture.

Masterblends are similar to masterbatch formulations however are not engineered as a concentrated additive. Masterblends generally are formulated to comprise all the materials (e.g., non-white colorant, white pigment, additive (such as filler, stabilizer, modifier, processing aid, antimicrobial, and so forth)) in a carrier (e.g., thermoplastic, wax, and the like), which can be processed into an end product as without additional mixing. Masterblends are generally produced on continuous melt processing equipment (e.g., continuous mixers, twin screw compounding extruder, single screw extruder, and the like), which form pellets or beads that comprise the specific concentration of the material. These pellets or beads can then be utilized in any melt processing operation to form an article of manufacture.

In addition to non-white colorants, additional additive(s) can be integrated within the composition. These additional additive(s) can be any chemical which provides a benefit without inhibiting attaining the desired YI value (e.g., at the amount the additive is used in the plastic); e.g., if they do not interfere with obtaining the desired color matching (e.g., obtaining the desired whiteness). Some possible additives include, but are not limited to, flame retardant(s) (e.g., halogenated material(s), organic phosphate(s), Rimar salt, and so forth), light stabilizer(s), fluorescent whitening agent(s), optical brightener(s), antioxidant(s), anti-static agent(s), blowing agent(s), processing aid(s), antioxidant(s), reinforcing agent(s), compatibilizer(s), filler(s) (e.g., to modify the physical properties of the polymer), and so forth, as well as combinations comprising at least one of the foregoing additives.

The low YI compositions can be prepared by various methods. For example, in one embodiment a masterblend can be prepared that can be employed to manufacture a co-extruded sheet product. In this example, a masterblend can first be prepared by combining polyetherimide (e.g. Ultem, commercially available from General Electric Company, Fairfield, Conn.), with solvent violet 13, solvent violet 36 (commercially available from Lanxess AG, Laverkussen, Germany), and titanium dioxide (such as that commercially available from E.I. Dupont, Mineral Products, Wilmington Del., and Millenium Inc. Hunt Valley, Md.). Once combined, these materials can be dry blended (e.g. tumbled) to initially disperse the colorants among the plastic pellets and/or powder. It is desirable that the colorants adhere to the pellets and/or powder, therefore surfactants and/or wetting agents can be employed.

After blending, the batch can optionally be dried, and then fed into a co-rotating twin-screw extruder. The extrusion process can mechanically reduce pigment agglomerates and disperse the non-white colorants throughout the polymer. The products of this compounding process can be strands of molten polymer in which the colorants are homogeneously dispersed. The strands can be cooled in a water bath, pelletized, dried, and packaged prior to further processing. The white plastic (e.g., white polyetherimide) composition produced can then be employed for the production of any desirable article of manufacture, even articles that have light colors whose color was otherwise not previously attainable or maintainable (e.g., after processing and/or aging) with that plastic. A co-extruded sheet can be produced for example, which comprises a non-filled polyetherimide base layer and a white polyetherimide top layer. In another example, a white electrical appliance housing can be produced comprising the white plastic via an injection molding process.

Referring now to Table 1, polyetherimide (e.g., Ultem®, commercially available from General Electric Plastics, Pittsfield, Mass.) samples are presented with their corresponding compositions, and several of their measured visual attributes including yellowness index (YI), whiteness (WI), and brightness (Br).

The samples tested were prepared by the following method: the components of the formulation (polyetherimide powder, $TiO_2$, additives and non-white colorants) were precisely weighed and combined in a container. The components were mixed by placing the container within a Harbil paint mixer (model 5G-HD made by Fluid Management Inc located at Wheeling, Ill. 60090) and shaken for 5 minutes. Pellets were formed by extruding the mixture utilizing a 24 mm twin extruder (Model TSE 24HC by Prizm). The zone temperatures of the extruder were set at temperatures between 400° F. (204° C.) and 650° F. (343° C.) and the screw speed was 600 rotations per minute (rpm).

The pellets were used to injection mold 50 mm by 100 mm color chips having a thickness of 3 mm using an 85 Ton Injection Molder Model FN1000 by Nessei Plastic Industrial Co. The molding temperatures were 640° F. (338° C.) to 680° F. (360° C.) with a mold temperature of 225° F. (107° C.). The color chips were spectroscopically analyzed on a GretagMacbeth Color Eye 7000 spectrophotometer to determine Yellowness Index (YI) per ASTM E313-73 (D1925) under D65 illuminant and 2 degree observer, Whiteness Index (WI) according to Ganz 82, and Brightness Index (Br) according to TAPPI T542 (1987).

As can be seen in Table 1 below, the baseline PEI, and Sample 1 through Sample 5 comprised polyetherimide resin (PEI; Ultem®). Sample 6 comprised polyvinyl fluoride (PVF). (Note: The PVF sample represents the current industry standard for acceptable visual properties, the sample was sold under the tradename Tedlare® produced by Dupont, Wilmington, Del., and has proven commercial acceptance.)

TABLE 1

| | Composition (pph) | | | | | |
| No. | PEI | $TiO_2$ | Non-white colorant | YI | WI | Br |
| --- | --- | --- | --- | --- | --- | --- |
| — | 100 | — | — | 64.7 | −144.1 | 29.7 |
| 1 | 100 | 10 | — | 20.3 | 42.8 | 72.5 |
| 2 | 100 | 20 | — | 17.5 | 53.5 | 76.6 |
| 3 | 100 | 30 | — | 16.3 | 58.6 | 79.1 |
| 4 | 100 | 20 | 0.0015 SV 13[1] 0.0048 SV 36[2] 0.0026 PB 24[3] | 9.7 | 69.1 | 76.1 |
| 5 | 100 | 20 | 0.0070 SV 13[1] 0.0002 SV 36[2] | 6.0 | 74.0 | 76.6 |
| 6 | PVF Film | | (not available) | 7.1 | 71.1 | 72.8 |

[1]SV 13 = Solvent Violet 13
[2]SV 36 = Solvent Violet 36
[3]PB 24 = Pigment Blue 24

Sample 1 is a polyetherimide chip comprising 10 pph $TiO_2$ (by weight) based on resin. Comparing the yellowness index (YI) of this chip to the PVF standard, it can be seen that Sample 1 exhibits a YI value of 20.3 compared to 7.1 for the PVF standard (Sample 6). Also, it can be seen that Sample 1 exhibits a whiteness (WI) of 42.8 compared to 71.1 for the PVF standard, and exhibits a brightness (Br) of 72.5 compared to 72.8 for the PVF standard. From these results, it can be determined that the composition of Sample 1, comprising 10 pph $TiO_2$ (by weight), demonstrates undesirably high yellowness, an undesirably low whiteness, and comparable brightness to the PVF sheet standard.

Sample 2 comprises an increased loading of $TiO_2$ compared to Sample 1, with 20 pph by weight. At this increased loading, Sample 2 exhibited a yellowness of 17.5 compared to 7.1 for the PVF standard (Sample 6), whiteness was 53.5 compared to 71.1 for the PVF standard, and brightness was 76.6 compared to 72.8 for the PVF standard. From these results, it can be determined that the additional $TiO_2$ loading in Sample 2, compared to Sample 1, decreased yellowness (from 20.3 to 17.5), increased whiteness (from 42.8 to 53.5) and increased brightness (from 72.5 to 76.6). However, Sample 2 continued to demonstrate undesirably high yellowness, undesirably low whiteness, and comparable brightness to the PVF standard.

When $TiO_2$ loading is yet increased further, up to a loading of 30 pph (by weight) in Sample 3, yellowness was still higher than the PVF standard, namely 18.1 compared to 7.1, and the whiteness had only increased up to 58.6, which remained lower than the PVF standards value of 71.1. From these experiments, it can be determined that increasing titanium dioxide loading did not increase whiteness or decrease yellowness to the values exhibited by the PVF standard.

Next, Sample 4 was evaluated. This sample comprised 20 pph (by weight) $TiO_2$ and 0.0089 pph of non-white colorants (namely 0.0015 pph Solvent Violet 13, 0.0048 pph Solvent Violet 36, and 0.0026 pph Pigment Brown 24). From the visual properties recorded, the non-white colorants decreased the yellowness of the sample to 9.7, and increased the whiteness to 69.1 as compared to the values exhibited by Sample 2 (which also comprised 20 pph $TiO_2$, but no non-white colorants). Furthermore, comparing Sample 4 to the PVF standard, Sample 4 produced a whiteness value of 69.1 compared to 71.1 for the PVF standard (Sample 6), and produced a brightness value of 76.1 compared to 72.8 for the PVF standard. Therefore, it can be concluded that the addition of non-white colorants produced an article with more desirable visual attributes than compared to an article with only titanium dioxide. Also, it can be concluded that an article produced with a composition comprising titanium dioxide and non-white colorants yield visual properties that approach the visual properties of the PVF standard.

Yet further, when the visual properties were evaluated for Sample 5, whose composition comprises 20 pph $TiO_2$ and 0.0072 pph non-white colorants (namely 0.0070 pph Solvent Violet 13 and 0.0002 pph Solvent Violet 36), the samples yellowness was 6.0 compared to 7.1 for the PVF standard (Sample 6), the samples whiteness was 74.0 compared to 71.1 for the PVF standard, and brightness was 76.6 compared to 72.8 for the PVF standard. From this data, it can therefore be concluded that the addition of a non-white colorant(s) can produce a product exhibiting higher whiteness, lower yellowness, and higher brightness than the PVF standard, Sample 6.

In addition to visual performance testing, a rheological analysis was performed to evaluate melt processability. Analysis of Sample 4 and the base Ultem® resin (comprising no additives) were conducted on a capillary rheometer to evaluate the influence of the integration of the additives to the flow properties. Melt viscosities of polymers predominantly determine the processing characteristics of a polymer. High melt viscosity polymer compositions (for example materials comprising a melt flow index of about 2 and about 8 grams per 10 minutes) can be desirable for extrusion, blown film, and sheet extrusion applications. Furthermore polymer compounds with moderate melt viscosities (for example materials comprising a melt flow index of about 8 and about 20 grams per 10 minutes) can be desirable for extrusion, and injection molding applications. Lastly, polymer compounds with low melt viscosities (for example materials comprising melt flow index values of about 20 to about 60 grams per 10 minutes) can be desirable for high flow injection molding operations and the like.

Figure 2:
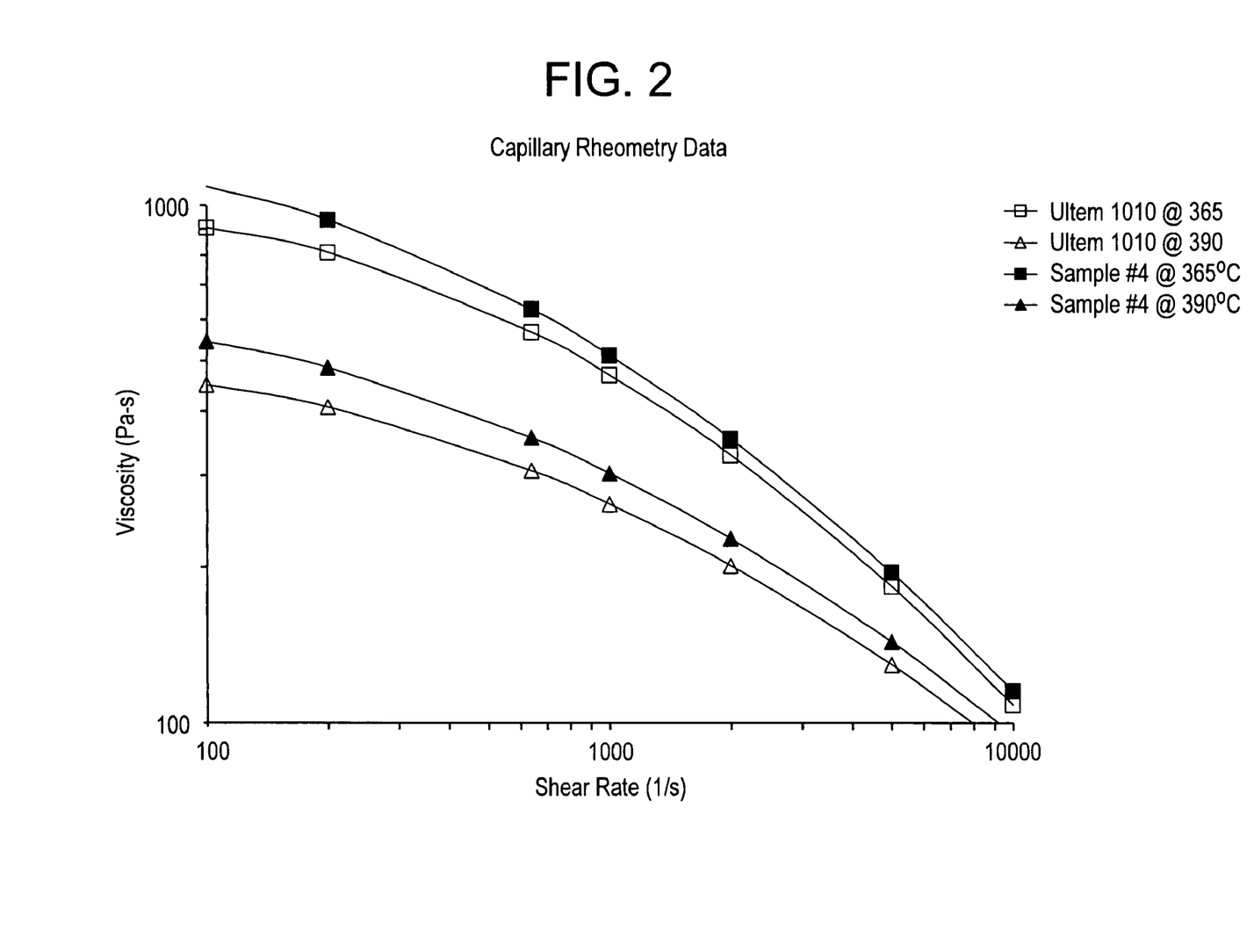
FIG. 2 is a graphical representation of rheological testing of Sample 4 and unfilled polyetherimide.

As can be seen in FIG. 2, an exemplary graph presenting viscosity (measured in pascal-seconds, Pa·s), versus shear rate (measured in inverse seconds, 1/s) of Sample 4 is presented. In addition, an unfilled polyetherimide graph is presented as well for comparative purposes, which is illustrated as "Ultem 1010". In the graph it can be seen that the viscosity of the polyetherimide increases with the addition of the colorants. More specifically, at 365° C. the unfilled polyetherimide sample, Ultem 1010, comprised a viscosity of about 471 Pa·s, and the viscosity of the white polyetherimide composition, Sample 4, comprised about 514 Pa·s at a shear rate of 1,000 1/s.

Figure 3:
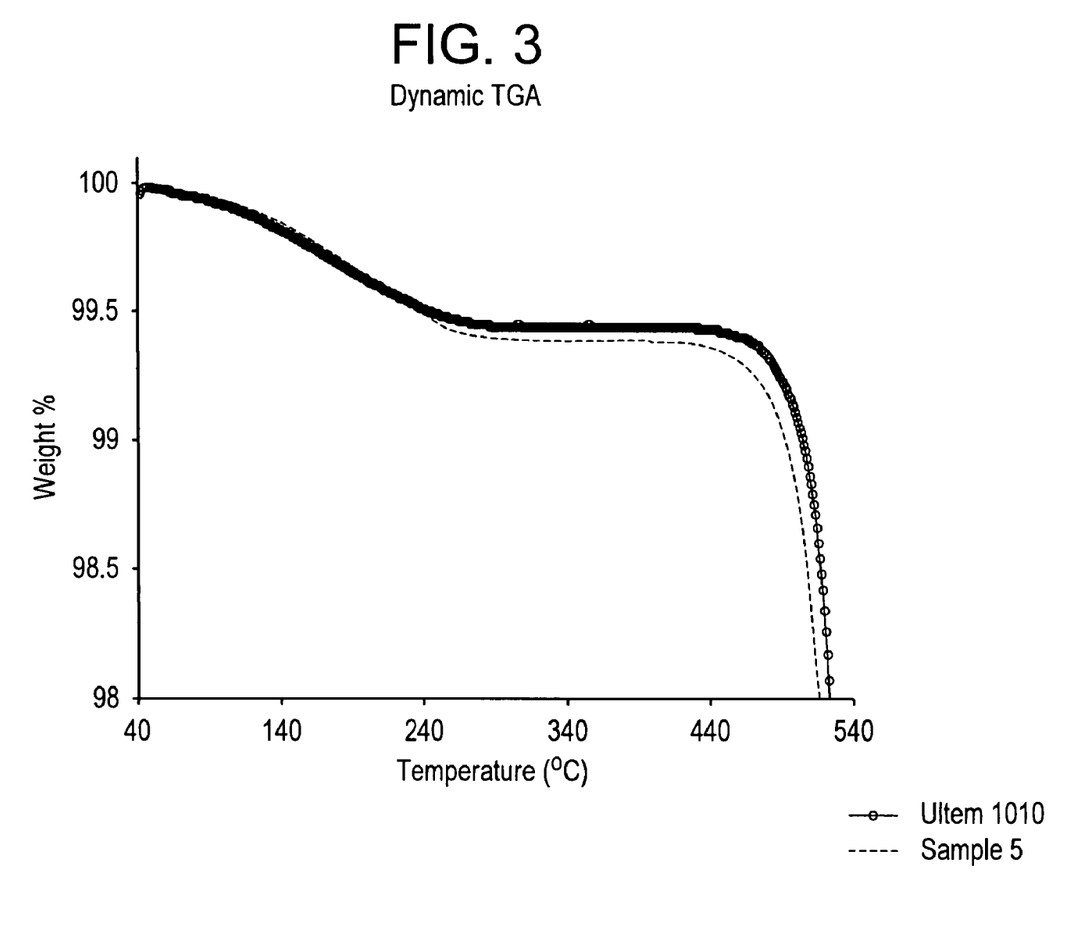
FIG. 3 is a graphical representation of a thermal gravimetric analysis of Sample 4 and unfilled polyetherimide.

In addition to the rheological measurements, thermal gravimetric analyses of Sample 4 and the unfilled (comprising no additives) polyetherimide base resin sample, "Ultem 1010", in order to compare the weight loss profile of the two materials over a given temperature range. During this test, each samples weight is measured as temperature is increased per a predetermined program. The resulting graph enables the interpretation of the thermal properties of a polymer composition (e.g., thermal stability, adsorption, desorption, desolvation, sublimation, vaporization, decomposition, solids reactions). As can be seen in FIG. 3, Sample 4 and the Ultem 1010 sample behave in a similar fashion based on their respective inflection points and the magnitude of the weight loss over the temperature range. This related behavior implies that Sample 4 did not experience a reduction in thermal stability due to the addition of the titanium dioxide and the colorants.

It is to be apparent that the bright white compositions disclosed herein can be used in any application and converted utilizing any polymer processing operation, such as, but not limited to, extrusion, co-extrusion, injection molding, gas-assisted injection molding, compression molding, blown film extrusion, extrusion blow molding, sheet extrusion, co-extruded sheet extrusion, melt casting, calendaring, coating, thermoforming, and the like.

In one specific application, the films discussed herein can be employed as high temperature labels, which can be used in many applications, such as, but not limited to, automotive and electronics applications, and the like. The films are envisioned in one embodiment as a monolayer substrate on which an adhesive can be applied. In another embodiment, it is further envisioned that the white polyetherimide films disclosed herein can be employed within a laminate comprising one or more additional layers configured on the printed side of the film to increase surface energy, increase weatherability, provide aesthetic properties, or the like. In these applications, the film can comprise a thickness of about 20 micrometers to about 200 micrometers, or more specifically about 30 micrometers to about 100 micrometers, and yet more specifically, from about 40 to about 60 micrometers. At these thicknesses, the visual properties of the films tested above can produce a label that possesses the desirable properties of high whiteness (WI), high brightness (Br), and low yellowness (YI) when compared to a PVF label. However, the label must also exhibit sufficient opacity (low light transmission) to provide sufficient "hiding ability" in such applications. Possible films include those disclosed in U.S. patent application Ser. No. 11/239,878, filed concurrently herewith (and hereby incorporated herein in its entirety).

Figure 4:
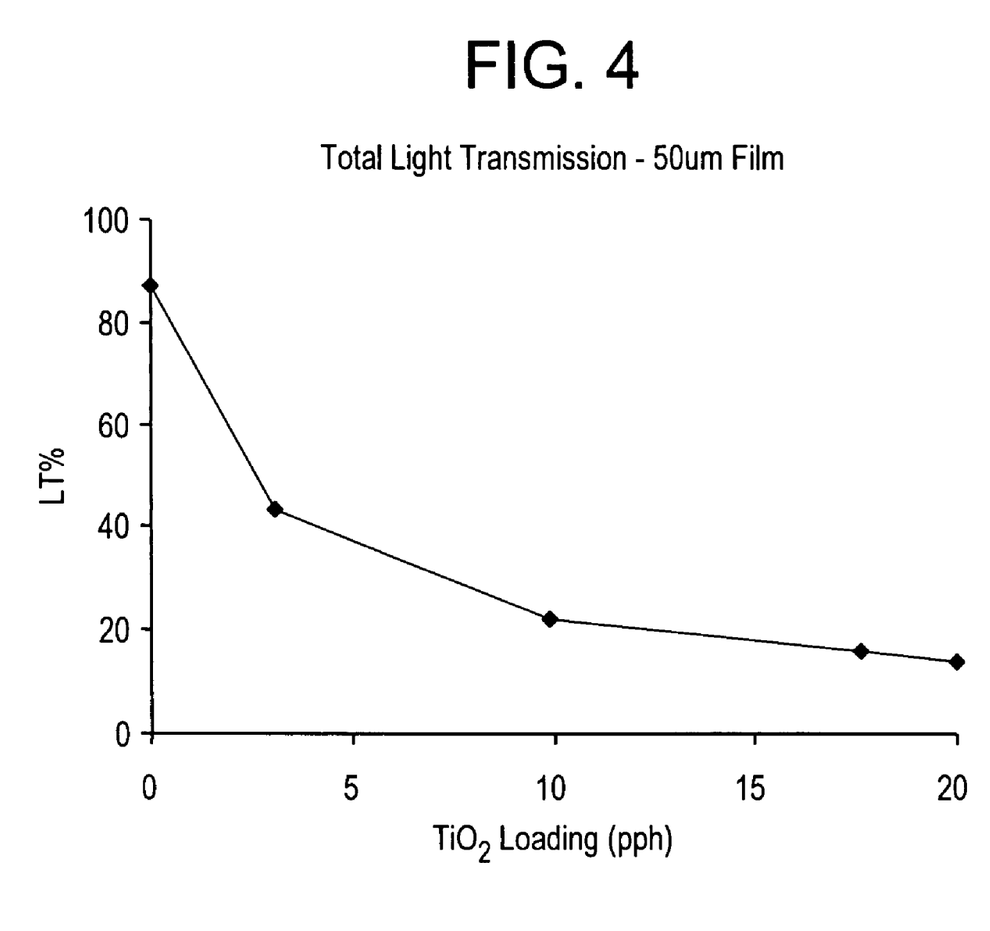
FIG. 4 is a graphical representation of total light transmission of Sample 4.

Referring now to FIG. 4, a graph illustrating light transmission testing of a 50 micrometer film comprising the composition of Sample 4 is presented which graphs light transmittance percent (LT %) versus titanium dioxide loading (in pph by weight), utilizing the GretagMacbeth Color Eye 7000 spectrophotometer, under C illuminant and 2 degree observer, with CIE1931 (xyz) color equation. The "Y" value is reported as the total light transmission. As can be seen in FIG. 4, as the loading of $TiO_2$ increases, the light transmittance through the product decreases in a non-linear fashion. At 20 pph $TiO_2$ loading, the total light transmission through the film is less than 20%, which is desirable for film and label applications. All test films were extruded on a single screw extruder (Killion Extruders, Inc, Model KN-150) with a screw diameter of 38 mm, a length over diameter ratio (L/D) of 24/1, and a 40 cm wide die. The pellets were fed at a feed rate of 20 Kg/hr, the screw speed was 40 RPM, and the barrel temperatures ranged between approximately 315° C. to 350° C.

In addition to the visual properties the PEI films retained desirable tear resistance. The tear resistance of the label varies between materials and manufacturers, however, for high temperature labels a specification of greater or equal to 125 newtons per mm (N/mm) can be employed, as tested by ASTM method D1004-94a.

It is further envisioned that the surface energy of the label can be increased around 35 dynes to 72 dynes (water wet condition) utilizing methods such as, but not limited to, corona discharge, plasma treatment, and/or flame treatment processes.

As noted above and illustrated in Table 1, it has unexpectedly been discovered that non-white colorants, e.g., color, can be employed in a plastic composition to improve whiteness (e.g., reduce yellowness). It is believed that plastic that would otherwise have a YI of greater than 11 (initially, after processing, and/or after aging) can attain a YI of less than or equal to about 10. For example, PEI can be produced with a YI of less than or equal to about 15, a WI of greater than or equal to about 60, and a Br of greater than or equal to about 60, or, more specifically to attain a composition YI of less than or equal to about 10, with a WI of greater than or equal to about 65, and a Br of greater than or equal to about 65. Furthermore, the plastic can be formed with an opacity (i.e., light transmission) of a less than or equal to about 20% (as measured on a 50 micrometer (μm) film utilizing a GretagMacbeth Color Eye 7000 spectrophotometer).

For example, polyetherimide comprises desirable mechanical and thermal properties however, due to its inherent amber color, bright white compositions have been previously unachievable. As has been discussed herein a white polyetherimide composition has been developed that comprises these desirable attributes and provide high opacity. Although applicable in many applications, this composition is especially useful for use in labeling films as bright white high temperature PEI films have been unachievable in the past without the addition of coatings and/or subsequent layer(s) of material. The composition employs the titanium dioxide and colorants to produce this desirable material.

In addition to PEI, other plastics, including those that have a low initial YI, but a high YI after processing and/or aging, can have a low YI even after processing and aging with the composition disclosed herein.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A plastic composition, comprising:
a virgin plastic, wherein the virgin plastic has a plastic yellowness index of greater than or equal to 55;
a white pigment; and
a non-white colorant;
wherein the composition has a whiteness index of greater than or equal to about 50, a composition yellowness index of less than 10, and a brightness of greater than or equal to 50, as measured on a 3 mm thick color chip under D65 illuminant and 2 degree observer.

2. The composition of claim 1, wherein the whiteness index is greater than or equal to about 60 and the brightness is greater than or equal to 60.

3. The composition of claim 2, wherein the whiteness index is greater than or equal to about 70 and the brightness is greater than or equal to 70.

4. The composition of claim 1, wherein a 3 mm color chip comprising the virgin plastic and the non-white colorant exhibits a reflectance of greater than or equal to about 15% at a wavelength of about 380 nm to about 580 nm.

5. The composition of claim 4, wherein the reflectance is greater than or equal to about 25%.

6. The composition of claim 5, wherein the reflectance is greater than or equal to about 35%.

7. The composition of claim 1, wherein the plastic yellowness index is measured after thermal aging.

8. The composition of claim 1, wherein the white pigment is present in the amount of 18 pph to about 45 pph by weight, based on 100 parts of the plastic.

9. The plastic composition of claim 1, comprising the reaction product of the virgin plastic, the white pigment, and the non-white colorant.

10. The composition of claim 1, wherein the non-white colorant is selected from the group consisting of Solvent Violet 13, Solvent Violet 36, Pigment Brown 24, Pigment Blue 15:4, Pigment Blue 29, and combinations comprising at least one of the foregoing.

11. An article formed from the composition of claim 1.

12. The article of claim 11, wherein an article has a whiteness index of greater than or equal to about 50, a composition yellowness index of less than 10, and a brightness of greater than or equal to 50, as measured on a 3 mm thick color chip under D65 illuminant and 2 degree observer.

13. The article of claim 11, wherein the article is a film having a thickness of about 20 micrometers to about 200 micrometers, wherein at a white pigment loading of 20 pph loading, the total light transmission through the film is less than 20%, and wherein the film has a side with an adhesive disposed thereon.

14. A plastic composition, comprising:
a virgin plastic, wherein the virgin plastic has a plastic yellowness index of greater than 11;
a white pigment; and
a non-white colorant;
wherein the composition has a whiteness index of greater than or equal to about 50, a composition yellowness index of less than 10, and a brightness of greater than or equal to 50, as measured on a 3 mm thick color chip under D65 illuminant and 2 degree observer, wherein the plastic comprises a material selected from the group consisting of polycarbonate, polyarylene ether, polyphenylenes, polysulfones, polyacrylates, polyketones, a combination comprising at least one of the foregoing plastics, and a reaction product formed from a reaction with at least one of the foregoing plastics.

15. The composition of claim 14, wherein the plastic yellowness index is greater than or equal to about 15.

16. The composition of claim 15, wherein the plastic yellowness index is greater than or equal to about 20.

17. The composition of claim 16, wherein the plastic yellowness index is greater than or equal to about 40.

18. A polyimide composition, comprising:
a polyimide;
a white pigment; and
a non-white colorant;
wherein the composition has a whiteness index of greater than or equal to about 60, a composition yellowness index of less than or equal to about 15, and a brightness of greater than or equal to 60, as measured on a 3 mm thick color chip under D65 illuminant and 2 degree observer.

19. The composition of claim 18, wherein the whiteness index is greater than or equal to about 65, a composition yellowness index of less than or equal to about 10, and the brightness is greater than or equal to 65.

20. The composition of claim 19, wherein the whiteness index is greater than or equal to about 70 and the brightness is greater than or equal to 70.

21. The composition of claim 18, wherein a 3 mm color chip comprising the polyimide and the non-white colorant exhibits a reflectance of greater than or equal to about 15% at a wavelength of about 380 nm to about 580 nm.

22. The composition of claim 18, wherein the polyimide comprises a material selected from the group consisting of polyetherimide, a combination comprising a plastic and polyetherimide, and reaction products formed from a reaction with polyetherimide.

23. The composition of claim 18, wherein the white pigment comprises titanium dioxide, and wherein the non-white colorant is present in an amount of about 0.0001 to about 1.0 pph by weight based upon 100 parts of the polyimide.

24. The composition of claim 18, wherein the non-white colorant is selected from the group consisting of Solvent Violet 13, Solvent Violet 36, Pigment Brown 24, Pigment Blue 15:4, Pigment Blue 29, and combinations comprising at least one of the foregoing.

25. The composition of claim 18, wherein the polyimide has a polyimide yellowness index is greater than or equal to about 40.

26. The composition of claim 25, wherein the polyimide yellowness index is greater than or equal to about 55.

27. An article formed from the composition of claim 18.

* * * * *